United States Patent [19]

Ilhage et al.

[11] 4,198,674

[45] Apr. 15, 1980

[54] LIGHT UNIT FOR VEHICLES

[75] Inventors: Bertil G. Ilhage, Trollhattän; Björn E. A. Envall, Vänersborg, both of Sweden

[73] Assignee: Saab-Scania Aktiebolag, Sodertalje, Sweden

[21] Appl. No.: 817,524

[22] Filed: Jul. 20, 1977

[30] Foreign Application Priority Data

Jul. 21, 1976 [SE] Sweden .................. 7608318

[51] Int. Cl.$^2$ .............................. B60Q 1/00
[52] U.S. Cl. .................... 362/80; 362/240; 362/238
[58] Field of Search ............... 362/61, 80, 240, 238; 340/93, 71, 84, 87, 91, 107

[56] References Cited

U.S. PATENT DOCUMENTS

| 3,456,153 | 7/1969 | Smith | 340/87 |
| 3,491,336 | 1/1970 | Anderson | 340/87 |
| 3,603,928 | 9/1971 | Speedy et al. | 362/38 |
| 3,809,880 | 5/1974 | Daumueller et al. | 340/93 |

FOREIGN PATENT DOCUMENTS 2647090  4/1978  Fed. Rep. of Germany ............ 362/61

Primary Examiner—Brooks H. Hunt
Assistant Examiner—J. L. Barr
Attorney, Agent, or Firm—Cushman, Darby & Cushman

[57] ABSTRACT

A lighting unit for a front corner on vehicle. There are a plurality of light housings that are screened off from each other in a light housing plate. Vertical walls defining first light housings are formed as a forwardly directed reflector as well as a sideways directed reflector. There is a second light housing in which a light source, in coaction with a backwardly directed reflector, provides a side backing light which is activated when engaging the vehicle reverse gear.

10 Claims, 3 Drawing Figures

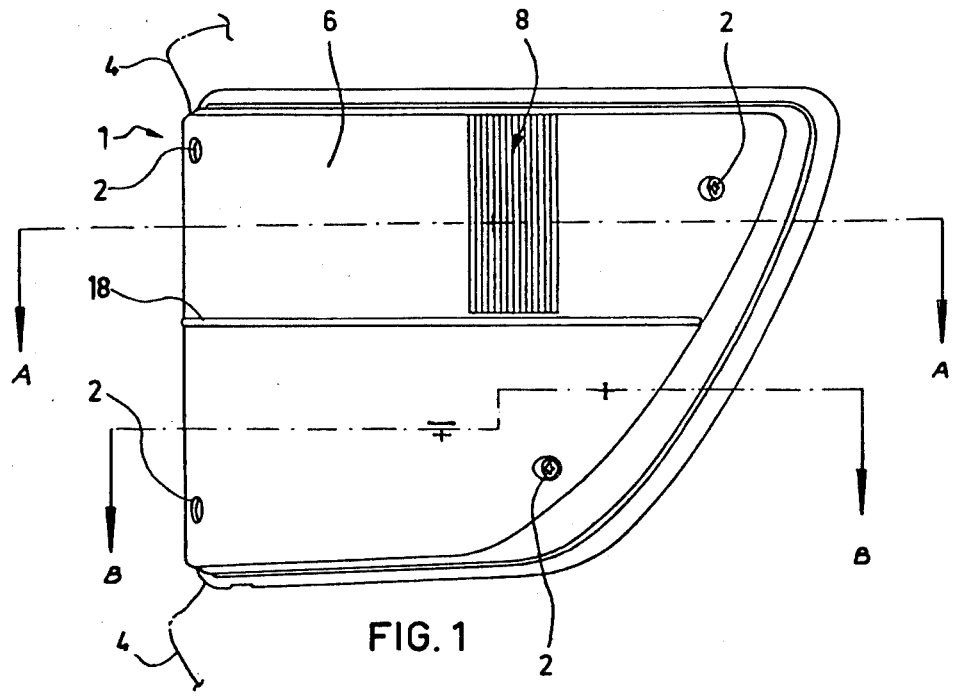
FIG. 1
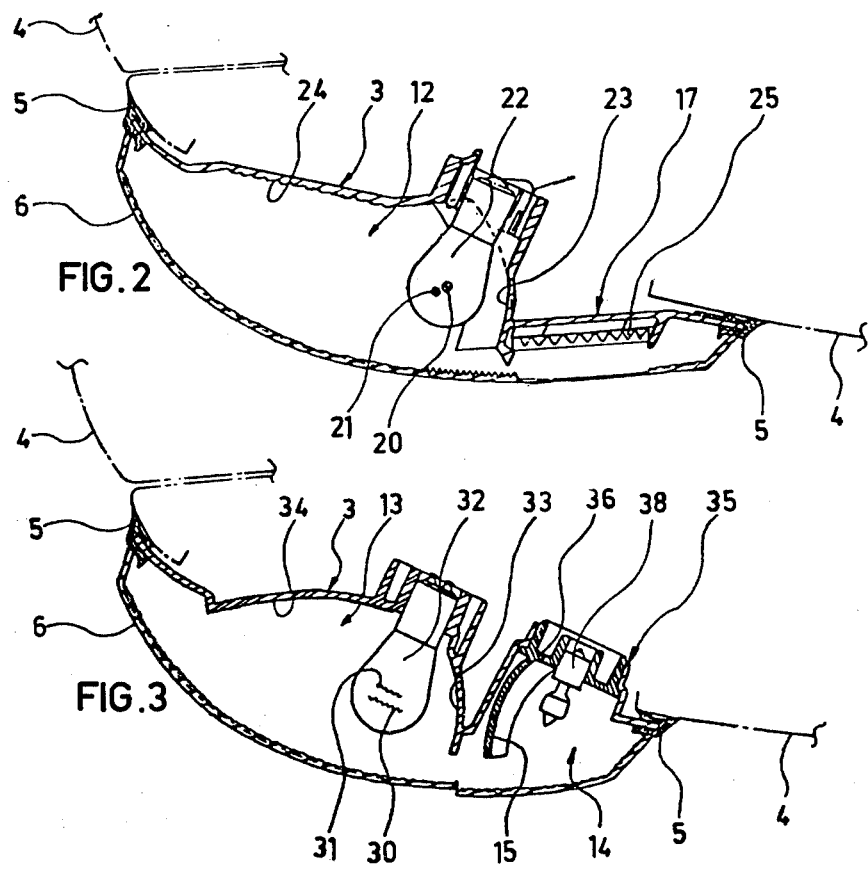
FIG. 2
FIG. 3

LIGHT UNIT FOR VEHICLES

The present invention relates to exterior vehicle lighting and is directed to a light unit at a front corner of a vehicle, comprising a plurality of light housings that are screened off relative to each other, there being arranged a plurality of light sources in the light housings for illuminating functions incorporated in the light unit.

Front light units for vehicles with signal lighting functions for flashing directional indication, positional lights and also for corner marking lights are previously known, just as it is also previously known to integrate side demarkation lights with reflection together with flashing direction indicators and positional lights in such light units. These known light units provide insufficient illumination in the areas at the sides of the respective vehicle however, and as a result thereof there is often damage to bodywork during night driving, when manoeuvering a vehicle in cramped spaces, especially during backing in parking places, garages and the like.

The present invention has the object of providing a front light unit for vehicles which gives better side illumination than previously known light units, thereby to facilitate vehicle manoeuvering during night driving. With this as background, the light unit according to the invention, apart from the known lighting functions mentioned above, also includes integrated lighting functions for increased side illumination, the light housings being arranged in an inner light housing plate attached to the vehicle, vertical defining walls for a first light housing provided on the light housing plate being formed partly as a rear forwardly directed reflector and partly as an interior sideways directed reflector.

The invention is essentially characterized in that a second light housing comprises at least one light source which in coaction with a backwardly directed reflector provides a side backing light which can be switched on and off in response to engagement and disengagement of the vehicle reverse gear.

In an embodiment of the light unit according to the invention, where the light housings are located in at least two substantially horizontal levels, a twin filament bulb comprising light sources for flashing light and side demarkation light is arranged in an upper forward light housing, and a twin filament bulb comprising light sources for positional light and corner marking light is arranged in a lower forward light housing.

The invention is further distinguished in that the light source for side backing light is arranged at substantially the same horizontal level as the light source for corner marking light, and that said light source and the reflector for the side backing light are incorporated in a separate bulb and reflector holder which is fitted by means of a snap lock in a recess in the light housing.

Further characteristics defining the invention are apparent from the following claims and may also be read from the description of an advantageous embodiment of the light unit according to the invention set forth hereinbelow. The description is made while referring to the attached figures, of which FIG. 1 shows a side view of a light unit on a vehicle, and FIGS. 2 and 3 show horizontal sections A—A and B—B in FIG. 1.

In the embodiment of the light unit according to the invention shown in FIG. 1, a light unit 1 is fixedly mounted on the left front corner of a vehicle body 4. The light unit 1 is thereby defined by a light housing plate 3 and a lamp glass 6, both units each being suitably made from a plastics material. The integrally made light housing plate 3 comprises a plurality of light housings 12–14, into which it is subdivided for light sources having different lighting functions. To mount the light unit 1 on the vehicle, the light housing plate 3 is attached to the vehicle body 4 by means of a plurality of screws (not shown) and after installation of the illuminating components, the lamp glass 6 is brought into contact with a frame surrounding the light housing plate 3 and fastened by a plurality of screws 2. In assembly, a rubber seal 5 constitutes a spacer between the light housing plate 3 and the vehicle body 4 as well as between the lamp glass 6 and the light housing plate 3.

The light housings 12,13,14 formed in the light housing plate 3 are divided into two horizontal levels separated from each other by a horizontal partition wall (not shown). Similar walls define the light housings upwardly and downwardly, respectively, with the object of preventing sunlight from being reflected in the light unit 1.

Both the upper and lower levels of the light housing plate 3 are formed with a vertical separating wall in the form of a forwardly directed reflector 23,33 which at their respective levels define a forward light housing 12,13. In FIG. 2 there is shown a horizontal section through the light housing plate 3 at its upper level, and therefrom it may be seen that the forward upper light housing 12 is also formed with a reflector 24, generally sideways directed relative to the longitudinal direction of the vehicle. Both reflectors 23,24 constitute a portion of the light housing 12 and are thus made integral with the light housing plate 3. The sideways directed reflector 24 is completely serrated and to advantage also has a grid-like relief pattern. A desirable sideways spread of incident light can hereby be obtained. The rear reflector 23 is made smooth and gives an increased light concentration in the forward direction of the vehicle.

In a position between said reflectors 23,24 a twin filament bulb 22 with two light sources 20,21 is fitted in the forward light housing 12. One light source 20 is intended to spread flashing directional indication light forward and sideways relative to the vehicle in coaction with the two reflectors 23, 24, and the other light source 21 is intended only to provide side demarkation lighting by direct light through the lamp glass 6.

In a position between the upper and lower levels of the light housing plate 3, the lamp glass 6 is provided with a horizontal strip or rim 18 outwardly defining the different levels of the light unit 1. In a position corresponding to the rear portion of the light housing 12, the lamp glass 6 is partially formed with a pattern 8 giving optical refraction of incident light, with the object of obtaining optimum flashing light function. As a consequence thereof, and apart from statutory spread of light forward and sideways in relation to the vehicle, the flashing light can also be made to cover a light angle which, seen backwards, closely coincides with the longitudinal side of the vehicle. Such an optimum spread of the flashing light is enabled by the outer contour of the lamp glass 6 lying outside the adjacent body side 4 of the vehicle.

Behind the first light housing 12, the light housing plate 3 is formed at the upper level with a reflection housing 17, in which a side demarkation reflector 25 is attached to the housing 17 by means of a snap fitting or the like, so that it is screened off in relation to the light housing 12.

In FIG. 3 there is shown a horizontal section through the light housing plate 3 at its lower level, and therefrom it may be seen that the lower forward (first) light housing 13 is also formed with a sideways directed reflector 34. Both reflectors 33,34 in the light housing 13 are formed integrally with the light housing plate 3, similar to the reflectors 23,24 in the upper forward light housing 12. The forwardly directed reflector 23 as well as the sideways directed reflector 34 in the light housing 13 are concave and have smooth surfaces, the optical axes of the reflectors being to advantage separate.

In a position between said reflectors 33,34 there is fitted a twin filament bulb 32 with light sources 30,31 in the lower forward light housing 13. One light source 30 is intended to give positional light forwards and sideways relative to the vehicle in coaction with the reflectors 33,34, and the other light source 31 is intended to give corner marking light forwards and sideways in coaction with the reflectors 33,34. As a consequence of the concavity and placing relative to the light source 31 of the reflectors 33,34, there is obtained heavy sideways spread together with a clearly appreciable ground illuminating effect from the corner marking light. The horizontal light angle relative to the forward direction of the vehicle namely attains more than 90 degrees' sideways spread, and this enables good side illumination and side orientation while travelling after dark. Such illumination is of especially great importance when parking, at sharp entries and road crossings, and also when driving after dark twisting roads without edge markings.

Behind the lower forward light housing 13, the light housing plate 3 is made with a rear (second) light housing 14 for a side backing light function. For this, the inner wall of the light housing plate 3 is made with an inwardly flanged hole 35, in which a separate bulb and reflector holder 36 is fitted by means of a snap lock. The reflector portion 15, which is concave and with a smooth surface, is so arranged that the light from a bulb 38 fitted to the lamp holder 36 is partially reflected backwards relative to the vehicle, the side backing light thus illuminating an area inclined backwards and to one side of the vehicle. Because the outer contour of the lamp glass 6 lies outside the vehicle body 4, the side backing light can illuminate an area quite close to the longitudinal side of the vehicle body. The total spread of direct and indirect light from the side backing light in the horizontal plane attainst at least 70 degrees, a light angle which supplements the corner marking illumination during backing in darkness so that satisfactory illumination is obtained along the whole of the area at the side of the vehicle.

Similarly to the normal vehicle backing lights, the side backing light according to the invention is arranged to advantage so that the light function is switched on and off in response to the position of the vehicle reverse gear (not shown). This means that when the reverse gear is engaged, the side backing light is on. The light intensity here should suitably agree with what is applicable for the normal backing light of the vehicle.

When forming the exemplified light unit according to the invention, consideration has been taken to controversial requirements partly with reference to large light surfaces for good visibility and partly with reference to small extension in height for accommodation to a vehicle with a low front. Said requirements would appear to apply to all modern passenger automobiles and justify a front corner-mounted light unit only being made with light housings at two levels. It is also important that at least the flashing light can easily be distinguished from an illuminated corner marking light. The integration of the side demarkation reflector and the side backing light in the light unit as well as increased visibility for remaining light functions has resulted in that, in the exemplified unit 1, the projected surface of the lamp glass 6 on a vertical plane in the longitudinal direction of the vehicle is greater than the corresponding projected surface on a vertical plane at right angles to the longitudinal direction of the vehicle.

The integration of all corner-placed light functions into a single light unit 1 is advantageous from many points of view. Apart from the light unit being conducive to traffic safety, it is also substantially simplified in relation to previously known light arrangements. Thus, the light housing plate 3 with all its light housings as well as the lamp glass 6 common to all light functions, can each be made in a single operation, and furthermore, the number of details required for said light functions can be considerably reduced. This naturally facilitates the work of assembly and disassembly and also enables simplified service and stock keeping.

The light unit according to the invention is however not limited to the described embodiment example but can be modified in alternative embodiments within the scope of the accompanying claims.

What we claim is:

1. A light unit for a front corner of a vehicle, comprising a plurality of light housings screened off relative to each other, in which there are arranged a plurality of light sources for light functions incorporated in the light unit, said light housings being formed in an inner light housing plate attached to the vehicle, there being vertical defining walls for at least one forward light housing in the light housing plate formed partly as a rear forwardly directed reflector and partly as an interior sideways directed reflector, characterized in that a rear light housing is arranged in the light housing plate at a location rearwardly of said forward housing, said rear housing having therein at least one light source which in coaction with a backwardly directed reflector provides a side backing light which can be switched on and off in response to engagement and disengagement of the vehicle reverse gear.

2. A light unit as claimed in claim 1, wherein there are two forward light housings which are located in at least two different substantially horizontal levels, the upper forward housing having therein a twin filament bulb comprising light sources for flashing light and side demarkation light, and the lower forward housing having therein a twin filament bulb comprising light sources for positional light and corner marking light.

3. A light unit as claimed in claim 2, wherein the light source in said rear housing is arranged at substantially the same horizontal level as the light source for corner marking light.

4. A light unit as claimed in claim 1, wherein the light source and the reflector in said rear housing for the side backing light are incorporated in a separate bulb and reflector holder which is fitted by means of a snap lock in a recess in the rear light housing.

5. A light unit as claimed in claim 1, including an outer lamp glass at least covering the rear light housing, the outer contour of said lamp glass lying outside the adjacent body side of the vehicle.

6. A light unit as claimed in claim 2, including a lamp glass at least covering the upper light housing for the flashing light function, in a position corresponding to the rear portion of the light housing for the flashing light function is partially formed with a pattern which gives optical refraction of incident light such that illumination is obtained backwards along the side of the vehicle body.

7. A light unit as claimed in claim 1 wherein all light housings in the light unit are covered by a common outer lamp glass.

8. A light unit for a front corner of a vehicle comprising: a generally concave housing plate having an inner space and an opening which faces forwardly, sideways and rearwardly; inner wall means cooperating with the housing plate so as to divide the inner space into at least one forward light housing which faces forwardly and sideways and a rear light housing which faces rearwardly and sideways, a light source in said forward housing cooperating with a forwardly facing reflector for directing light forwardly through said opening and with a outwardly facing reflector for directing light sideways through said opening; a light source in said rear housing, adapted to be switched on and off in response to engagement and disengagement of the vehicle reverse gear, for providing sideways light through said opening and cooperating with a vertical rearwardly facing reflector for directing light rearwardly through said opening.

9. A light unit as in claim 8 wherein there are upper and lower forward light housings defined in said inner space by said wall means, each forward housing having its respective light source and reflectors, and wherein said rear housing is arranged at substantially the same horizontal level as the lower forward housing said unit including a lamp glass covering said opening so as to be common to all of said housings.

10. A light unit as in claim 9 wherein the projected surface of said lamp glass on a vertical plane in the longitudinal direction of the vehicle is greater than the corresponding projected surface on a vertical plane at a right angle to the longitudinal direction of the vehicle.

* * * * *